BEARING

Original Filed Dec. 6, 1955 2 Sheets-Sheet 1

INVENTOR.
EARL A. THOMPSON
BY
Barnes, Kisselle, Raubline & Raisch
ATTORNEYS

BEARING

Original Filed Dec. 6, 1955 2 Sheets-Sheet 2

INVENTOR.
EARL A. THOMPSON
BY
Barnes, Kisselle, Raubline & Leisch
ATTORNEYS.

United States Patent Office

Re. 25,028

Reissued Aug. 15, 1961

25,028

BEARING

Earl A. Thompson, Ferndale, Mich.

Original No. 2,873,152, dated Feb. 10, 1959, Ser. No. 551,256, Dec. 6, 1955. Application for reissue Feb. 9, 1961, Ser. No. 88,238

10 Claims. (Cl. 308—73)

Matter enclosed in heavy brackets [ ] appears in the original patent but forms no part of this reissue specification; matter printed in italics indicates the additions made by reissue.

This invention relates to a bearing.

It is an object of this invention to provide a bearing which has substantially zero clearance at rest and in which the clearance between the bearing and the rotating member supported by the bearing can be generally predetermined to meet the load requirements to which the bearing is to be subjected.

A further object of the invention is to provide a bearing of the above described type that is fashioned as an integral unit so that it can be removed or replaced as a single unit in an assembly.

Figure 1:
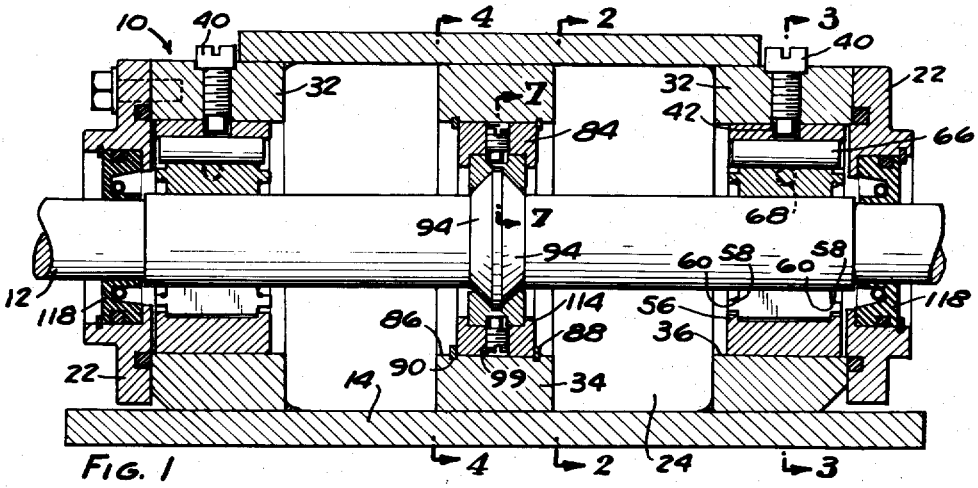
FIG. 1 is a sectional view of a shaft supporting arrangement employing bearings of the present invention.
Figure 2:
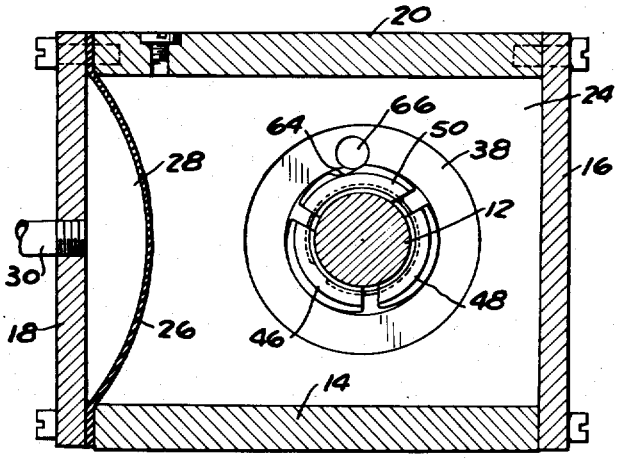
FIG. 2 is a sectional view along the lines 2—2 in FIG. 1.

For the purposes of description, there is shown in FIG. 1 a housing 10 in which a shaft 12 is supported for rotation. Housing 10 includes a base 14, side walls 16 and 18, a top wall 20 and end plates 22. These members may be assembled in any desired relation so as to provide a closed oil chamber 24 in which the bearing assemblies are housed. Chamber 24 is filled with oil, and the pressure thereof may be maintained at a desired value by providing a diaphragm 26 adjacent one wall of the housing forming an air chamber 28, the pressure in which may be regulated by means of an air pump, not shown, connected to a conduit 30 communicating with chamber 28.

Within housing 10, there is provided a series of bearing blocks, three being illustrated. Two of these bearing blocks, designated 32, are disposed one adjacent each end of housing 10 for supporting the radial load carrying bearings of this invention. The other bearing block, designated 34, is arranged to support the axial thrust load carrying bearing.

Figure 5:
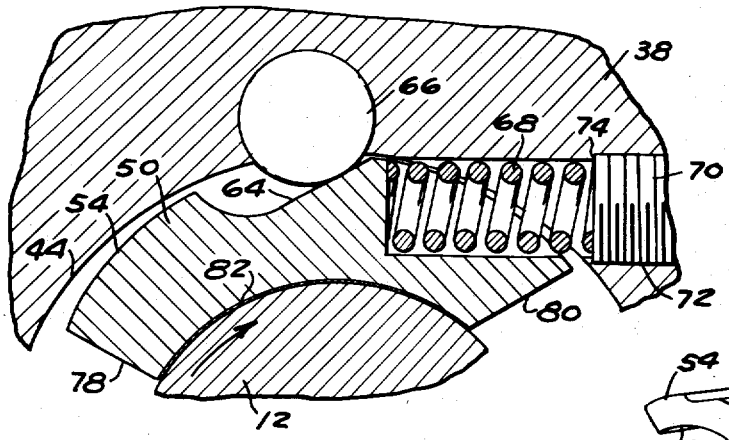
FIG. 5 is a fragmentary sectional view showing on an enlarged scale a portion of the arrangement illustrated in FIG. 3.
Figure 6:
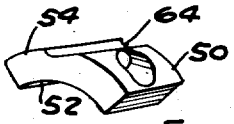
FIG. 6 is a perspective view of the bearing shoe illustrated in FIG. 5.
Figure 7:
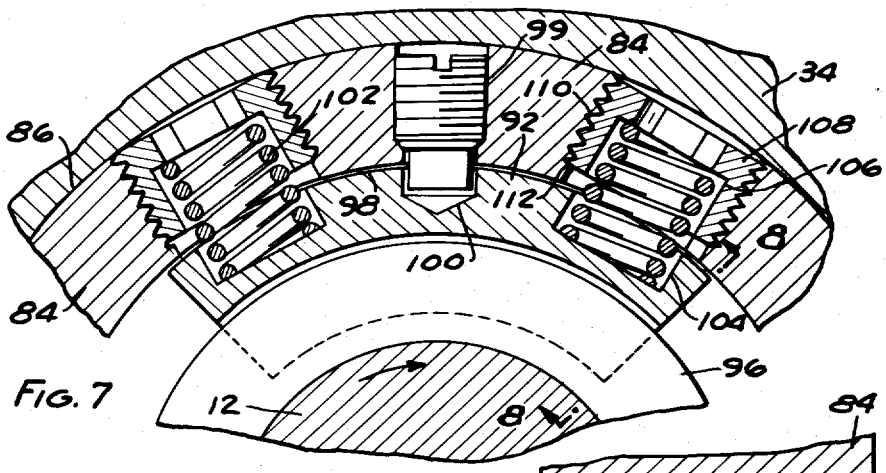
FIG. 7 is a sectional view on an enlarged scale taken along the lines 7—7 in FIG. 1.

In FIGS. 3, 5, 6 and 9 are illustrated details of the radial load carrying bearing of this invention. Within the bore 36 of each bearing block 32, there is arranged a bearing retainer or outer race 38. The cylindrical outer surface of retainer 38 has a rather close fit with the bore 36, and a dogpoint screw 40 threaded through block 32 and having its end projecting in a socket 42 in retainer 38 is utilized for preventing circumferential displacement of retainer 38. Retainer 38 is fashioned with an inner cylindrical bore 44 in which are arranged three bearing shoes 46, 48 and 50 which form the inner race of the bearing. These shoes are in the shape of arcuate cylindrical segments, the inner cylindrical surface 52 of which is generated by a radius which corresponds to the radius of the portion of shaft 12 that the bearing supports. The outer cylindrical surface 54 is generated by the radius which is slightly less than the radius of the bore 44 of retainer 38. The shoes 46, 48 and 50 are prevented from being displaced axially within retainer 38 by annular, radially inwardly extending flanges 56 at each end of the bore 44 on retainer 38 (FIG. 1). The shoes are maintained in their assembled relation by means of snap rings 58 seated in annular grooves 60 at each end of the shoes. The two shoes 46 and 48 are prevented from being displaced circumferentially within retainer 38 by anchor pins 62 in retainer 38. Shoe 50 is provided on its outer cylindrical surface with an inclined cam face 64 that engages with a dowel pin 66. Roller 66 extends axially within retainer 38 and is fixed therein with a portion of its cylindrical surface projecting into the bore 44 of retainer 38. Shoe 50 is biased by a coil spring 68 so that the cam face 64 engages with roller 66. Coil spring 68 is maintained under a predetermined tension by a lock screw 70. Lock screw 70 is threaded into a socket 72 in retainer 38, and the socket is fashioned with a shoulder 74 at its inner end against which the end of screw 70 is arranged to abut so that when the screw is driven home in socket 72, spring 68 is loaded to a predetermined value by reason of the interengagement of pin 66 with the cam face 64 (FIG. 5).

Figure 3:
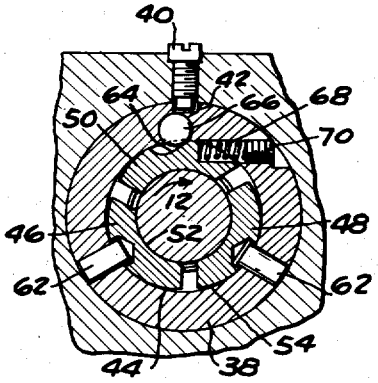
FIG. 3 is a sectional view along the lines 3—3 in FIG. 1 showing a radial load carrying bearing of the present invention.
Figure 4:
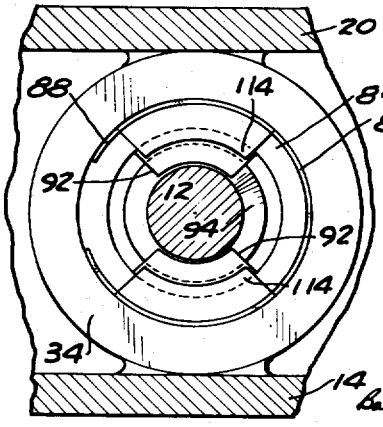
FIG. 4 is a view along the lines 4—4 in FIG. 1 showing a bearing of this invention designed for carrying an axial thrust load.
Figure 9:
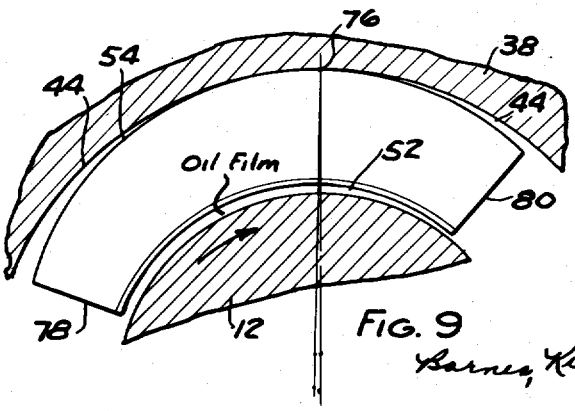
FIG. 9 is a view which is more or less diagrammatic showing in an exaggerated way the relative positions of the bearing members under operating conditions.
Figure 8:
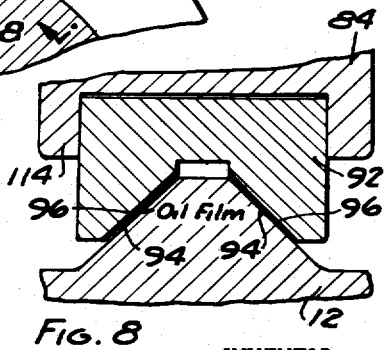
FIG. 8 is a sectional view taken along the lines 8—8 in FIG. 7.

Referring particularly to FIGS. 3, 5 and 9, it will be noted that shoes 46 and 48 contact the inner periphery of retainer 38 along a line which is centrally offset with respect to the arcuate extent of these shoes. Assuming that shaft 12 rotates in the direction indicated by the arrows in FIGS. 3, 5 and 9, then it is apparent that the portion of each of the shoes 46 and 48 between the line of contact or point of fulcrum 76 and the leading end 78 is of greater arcuate extent than the portion of the shoe between the line of contact 76 and the trailing end 80 of the shoe. Each of the shoes is lined around its inner surface with a layer of babbitt metal 82.

With this arrangement, when the shaft 12 is at rest, the tension of spring 68 tends to shift shoe 50 in a counterclockwise direction around shaft 12 as viewed in the drawings; and the action of pin 66 on cam surface 64 displaces shoe 50 radially inwardly so that there is substantially zero clearance between the shaft 12 and the shoe 46, 48 and 50. The line of contact between shoe 50 and roller 66 is offset as explained above with reference to shoes 46 and 48. As shaft 12 starts to rotate, the oil pressure between the leading edge of each shoe and the surface of shaft 12 tends to build up, thus tending to pivot each of the shoes slightly in a clockwise direction about their line of contact with retainer 38 (see (FIG. 9). Pivoting or cocking of shoe 50 in this manner causes spring 68 to compress and enables shoe 50 to shift outwardly a slight extent by reason of engagement of pin 66 with the inclined cam face 64. As the speed of rotation of shaft 12 increases, the pressure of the oil film between the shoes and the shaft increases; and the shoes move radially outwardly to an extent where the cumulative effect of the pressure of the oil film on the shoes in a radially outwardly direction is balanced by the tension of spring 68 acting through pin 66 and the inclined cam face 64. However, it will be appreciated that as the shoes pivot and tend to increase the thickness of the oil film at the leading edge of the shoe, the pressure at the leading edge tends to diminish since the thickness of the oil film at this point is greater than adjacent the trailing edges of the shoes. The oil film is wedge shaped in section. Eventually, a point is reached where the pressure of the oil film between the shoes and the shaft is balanced by the loading of spring 68. At this time, the pressure is greater at a zone adjacent the trailing edge of the shoe than at the leading edge. However, in view of the design of these shoes such that the line of contact with the retainer is spaced more closely to the trailing edge of the shoes than the leading edges of the shoes, the action of spring 68 acting through these unbalanced lever arms tends to maintain a generally uniform distribution of pressure throughout the oil film between the shoes and the shaft. The oil film thus assumes the wedge shaped cross section shown in FIG. 9 and may be on the order from about .0003" to .0008" thick, the thickness of the oil film at the leading edge being about .0002" to .0005" greater than at the trailing edge. The thickness of this oil film, of course, depends on such factors as the loading of spring 68, the viscosity of the oil and the speed of rotation; and it is substantially unaffected by the externally applied load on the shaft since the pressure of this oil film is greater than the pressure of the externally applied load.

The details of the thrust bearing arranged within bearing block 34 are shown in FIGS. 1, 4, 7 and 8. This bearing includes an outer race or retainer 84 seated within the bore 86 of bearing block 34. Retainer 84 is prevented from shifting axially in bearing block 34 by means of snap rings 88 seated in annular grooves 90 in the bore 86 of block 34 and engaging the side faces of retainer 84 (FIG. 1). Within retainer 84, there is arranged a pair of diametrically opposed shoes 92. The portion of shaft 12 supported by this bearing is provided with opposed, conically-shaped surfaces 94; and shoes 92 are similarly shaped in cross section so that the babbitt lined bearing faces 96 of the shoes are arranged to seat snugly on the conical surfaces 94 of shaft 12. In other words, the shaft 12 and the shoes 92 are provided with generally V-shaped configurations in cross section with the radius of the shaft along the faces 94 being substantially the same as the radius about which the surfaces 96 of the shoes are generated. However, the radius about which the outer cylindrical surface 98 of the shoes is generated is less than the inner diameter of retainer 84. The shoes 92 are prevented from rotating within retainer 84 by a pair of dogpoint screws 99, the inner ends of which engage in sockets 100 provided in the outer faces of the shoes. The shoes 92 are biased radially inwardly to enter-engage the faces 94 and 96 by means of a pair of compression springs 102. These springs are positioned one at each side of screw 99 with their inner ends seated in sockets 104 in shoes 92 and their outer ends in a counterbore 106 formed at the inner end of lock screws 108. Screws 108 are threaded in sockets 110 in retainer 84, and these sockets are provided with accurately positioned shoulders 112 at their inner end which limit the displacement of the screws in a radially inward direction and thus enable loading of springs 102 to a predetermined extent.

For the purposes of assembly, retainer 84 is fashioned with flanges 114 which are in the form of arcuate segments and between which the shoes 92 are arranged in their operative position to prevent axial displacement of the shoes within retainer 84. Flanges 114 have an arcuate extent and are arranged circumferentially such that each of the shoes 92, when mounted on the shaft as shown, can be slipped axially into retainer 84 between the opposed edges of the two flanges 114 and then shifted approximately 90° to the position illustrated in FIGS. 4 and 7 where the shoes are engaged at each side by the flanges 114. Thereafter, springs 102, lock screws 108 and dogpoint screws 99 can be assembled as shown to lock each shoe in place.

In operation, when shaft 12 is at rest, shoes 92 are biased radially inwardly by springs 102 so that the babbitt line faces 96 of the shoes are in substantially coplanar engagement with the conically arranged surfaces 94 of the shaft. As the shaft is rotated, the pressure of the oil film between the opposed faces of the shaft and the shoes tends to build up; and the shoes move radially outwardly against the tension of springs 102. The thickness of the oil film between these faces is determined in part by the loading of springs 102; that is to say, this oil film has a thickness such that the pressure of the oil film is balanced by the tension of springs 102.

The purpose of pressure on the oil is to prevent oil from vaporizing and to prevent aeration of oil. The pressure of the oil in housing 10 can, of course, be adjusted to the desired value by controlling the air pressure on diaphragm 28. It is desirable to maintain the oil in housing 10 under superatmospheric pressure in order to prevent aeration and vaporization of the oil. Oil seals 118 in end plates 22 seal around the projecting ends of shaft 12 and prevent leakage of oil from housing 10.

Thus, it will be seen that since the screw 70 and the screws 108 are arranged to be advanced into their threaded sockets a predetermined extent, the loading of springs 68 and 102 can be quite accurately predetermined. Thus, a bearing may be designed for operation under a specific load by simply designing the spring 68 or 102 such that when the screws retaining these springs are driven home in their sockets, the desired loading of the spring is obtained.

I have therefore provided a bearing which is designed to have substantially zero clearance when the shaft is at rest and which is further designed to produce predetermined and substantially uniform distribution of pressure throughout the oil film between the shaft and the bearing under operating conditions.

In addition, it will be observed that each of the bearings described herein are designed so that they can be fashioned and assembled as an integral unit.

I claim:

1. A bearing comprising inner and outer annular races, said inner race comprising a plurality of arcuate segments spaced circumferentially around and within said outer race, means on said outer race and at least one of said segments forming a circumferentially extending spiral cam face and a cam follower engageable therewith, said cam and cam follower being arranged so that said segment is displaced radially when rotated within said outer race, means yieldably biasing said segment circumferentially in a direction within said outer race so as to normally urge said segment radially inwardly and means for adjusting the biasing influence of said biasing means to a predetermined fixed amount.

2. A bearing comprising inner and outer annular races, said inner race comprising a plurality of arcuate segments spaced circumferentially around and within said outer race, means on said outer race and at least one of said segments forming a circumferentially extending cam face and a cam engageable therewith, said cam and cam face being arranged such that said segment is displaced radially when rotated within said outer race, means yieldably biasing said segment circumferentially in a direction within said outer race so as to normally urge said segment radially inwardly and means for adjusting the biasing influence of said biasing means to a predetermined fixed amount, said cam face being formed on the outer surface of said segment and said cam being disposed adjacent the inner periphery of said outer race, said biasing means comprising a spring acting between said outer race and said one segment, said adjusting means being adapted to tension said spring a predetermined fixed amount, said spring comprising a coil spring and said regulating means comprising a screw threadedly engaged with said outer race and having one end thereof engaging said spring, said screw being advanceable to compress said spring and means on said outer race for limiting the extent to which the screw may be advanced to a predetermined fixed position.

3. A bearing for supporting a rotating member comprising inner and outer annular races, said inner race comprising a plurality of arcuate segments spaced circumferentially around and within said outer race, said outer race having a generally cylindrical inner peripheral surface, said arcuate segments each having a generally cylindrical outer peripheral surface, the radius of the inner periphery of said outer race being greater than the radius of the outer periphery of said segments, at least some of said segments having the outer peripheral surface thereof engaging the inner peripheral surface of said outer race and being pivotally supported thereby for rocking movement relative to said outer race, means yieldably biasing at least one of the other segments radially inwardly relative to said outer race, said segments lying in contact with said outer race along a line of contact between the outer peripheral surface of said segments and the inner peripheral surface of said outer race which is disposed closer to one end of the segments than the opposite end and means on said outer race and said one segment forming a circumferentially extending cam surface and a cam follower engaged therewith, said cam and cam follower being arranged so that said segment is displaced radially when rotated within said outer race, said biasing means comprising a spring acting between said outer race and said segment and tending to rotate said segment in a direction so that the segment is displaced radially inwardly.

4. A bearing for supporting a rotating member comprising inner and outer annular races, said inner race comprising a plurality of arcuate segments spaced circumferentially around and within said outer race, said outer race having a generally cylindrical inner peripheral surface, said arcuate segments each having a generally cylindrical outer peripheral surface, the radius of the inner periphery of said outer race being greater than the radius of the outer periphery of said segments, at least some of said segments having the outer peripheral surface thereof engaging the inner peripheral surface of said outer race and being pivotally supported thereby for rocking movement relative to said outer race, means yieldably biasing at least one of the other segments radially inwardly relative to said outer race, said segments lying in contact with said outer race along a line of contact between the outer peripheral surface of said segments and the inner peripheral surface of said outer race which is disposed closer to one end of the segments than the opposite end, means on said outer race and said one segment forming a circumferentially extending cam surface and a cam follower engaged therewith, said cam and cam follower being arranged so that said segment is displaced radially when rotated within said outer race, said biasing means comprising a spring acting between said outer race and said segment and tending to rotate said segment in a direction so that the segment is displaced radially inwardly, and a screw on said outer race engaging one end of said spring, said screw being advanceable to compress said spring and means on said outer race for limiting the extent to which said screw may be advanced to a predetermined fixed position.

5. A bearing comprising inner and outer annular races, said inner race comprising a plurality of arcuate segments spaced apart circumferentially within said outer race, means interconecting each of said segments and said outer race for preventing relative axial and free rotary movement of said races while permitting said inner race to move radially of said outer race, spring means acting between said outer race and each of said segments and urging said segments radially inwardly, means for loading said springs a predetermined fixed amount, said spring means comprising coil springs and said spring loading means comprising screws threaded in said outer race and engaging one end of said springs, said screws being advanceable in said outer race to compress said springs, and means for limiting the extent to which said screws may be advanced to a predetermined fixed position on said outer race, the inner peripheral surface of said segments being of V-shaped configuration in axial section.

6. A bearing comprising inner and outer annular races, said inner race comprising a plurality of arcuate segments spaced apart circumferentially within said outer race, means interconnecting each of said segments and said outer race for preventing relative axial and free rotary movement of said races while permitting said inner race to move radially of said outer race, spring means acting between said outer race and each of said segments and uring said segments radially inwardly, means for loading said springs a predetermined fixed amount, said spring means comprising coil springs and said spring loading means comprising screws threaded in said outer race and engaging one end of said springs, said screws being advanceable in said outer race to compress said springs and means for limiting the extent to which said screws may be advanced to a predetermined fixed position on said outer race, said outer race being provided with a plurality of flanges extending radially inwardly beyond the inner peripheral surface thereof at each side of the outer race, the circumferential space between adjacent ends of successive flanges being greater than the circumferential extent of said segments, whereby said segments can be inserted axially through said spaces into said outer race and then rotated to a position between the flanges on the opposite sides of said outer race to prevent relative axial movement of said segments and outer race.

7. A shaft journal bearing of the rocking shoe type including a self-contained cartridge assembly which comprises a ring member having an internal bore provided with a plurality of shoe anchors, a plurality of bearing shoes associated with the anchors and having convex back surfaces abutting the interior of the bore for rocking movement therein, another shoe and other anchor being provided with interengaging cam surfaces, one of which is inclined to a tangent to the bore and effective to cam the other shoe radially outward and inward in response to partial rotation of that shoe with and against the rotation of the shaft, and a spring acting tangentially between said other shoe and the ring in opposition to shaft rotation.

8. A bearing for supporting a rotating member comprising inner and outer annular races, said inner race comprising a plurality of arcuate segments spaced circumferentially around and within said outer race, said outer race having a generally cylindrical inner peripheral surface, said arcuate segments each having a generally cylindrical outer peripheral surface, the radius of the inner periphery of said outer race being greater than the radius of the outer periphery of said segments, at least some of said segments having the outer peripheral surface thereof engaging the inner peripheral surface of said outer race and being pivotally supported thereby for rocking movement relative to said outer race, means yieldably biasing at least one of the other segments radially inwardly relative to said outer race, said segments lying in contact with said outer race along a line of contact between the outer peripheral surface of said segments and the inner peripheral surface of said outer race which is disposed closer to one end of the segments than the opposite end, and means on said outer race and said one segment forming a circumferentially extending cam surface and a cam follower engaged therewith, said cam and cam follower being arranged so that said segment is displaced radially when rotated within said outer race.

*9. A preloaded dynamically lubricated shaft journal bearing comprising a housing forming a support spaced radially from the shaft, a first and a second segmental bearing shoe each mounted in the housing for slight rocking movement and supplied with lubricant to generate dynamically a load supporting wedge of lubricant between the shaft and the shoe, means mounting the second shoe for bodily movement circumferentially and radially with respect to the housing and shaft and co-related so that circumferential motion in the direction of shaft rotation produces radially outward motion, and yieldable biasing means urging the second shoe counter to the direction of shaft rotation with a predetermined force whereby to preload the second bearing shoe against the dynamic fluid pressure in the lubricant wedge by an amount determined by the frictional drag of the lubricant against the second shoe in opposition to the biasing force so that the shaft is supported by lubricant wedges sufficiently thin that large changes in external load on the shaft do not produce significant shaft displacement.*

*10. A preloaded anti-friction bearing arrangement for supporting a high speed rotating shaft with a high degree of positional stability through different speed ranges comprising in combination a stationary housing enclosing a portion of the shaft, a plurality of rocker shoes mounted nearer their trailing edges than their leading edges in the housing for limited oscillatory movement to define with the rotating shaft a plurality of generally mutually variable wedge-shaped lubricant zones diminishing toward the trailing edges of the shoes, means for supplying lubricant between the leading edges of the shoes and the rotating shaft to create a plurality of hydrodynamic films of lubricant in the wedge-shaped zones for bearing the shaft, yieldable balancing means connected between the housing and one of the shoes, and shoe clearance regulating means dynamically responsive to the shaft speed for widening the wedge-shaped zones and also oppositely responsive to the yieldable balancing means for narrowing the wedge-shaped zones whereby the size of the lubricant films is automatically varied to complement their dynamic shaft bearing pressure thus supporting the shaft with a high degree of positional stability through different speed ranges.*

References Cited in the file of this patent or the original patent

UNITED STATES PATENTS

| | | |
|---|---|---|
| 1,870,857 | Mathewson | Aug. 9, 1932 |
| 1,882,102 | Wallgren | Oct. 11, 1932 |
| 2,072,812 | Hass | Mar. 2, 1937 |
| 2,142,021 | Ernst et al. | Dec. 27, 1938 |
| 2,171,208 | Dall et al. | Aug. 29, 1939 |
| 2,222,307 | Blood | Nov. 19, 1940 |
| 2,363,260 | Peskin | Nov. 21, 1944 |
| 2,384,589 | Baldenhofer | Sept. 11, 1945 |
| 2,743,142 | Balsiger | Apr. 24, 1956 |

FOREIGN PATENTS

| | | |
|---|---|---|
| 553,068 | France | Feb. 3, 1923 |
| 493,560 | Great Britain | Oct. 11, 1938 |
| 858,479 | Germany | Dec. 8, 1952 |
| 926,644 | Germany | Apr. 21, 1955 |